United States Patent [19]

Padden

[11] Patent Number: 5,390,878

[45] Date of Patent: Feb. 21, 1995

[54] STRAIN ISOLATOR ASSEMBLY

[75] Inventor: Vincent T. Padden, Brightwaters, N.Y.

[73] Assignee: Grumman Aerospace Corporation, Long Island, N.Y.

[21] Appl. No.: 15,122

[22] Filed: Feb. 9, 1993

[51] Int. Cl.6 .......................................... B64D 27/00
[52] U.S. Cl. ................... 244/53 R; 60/39.31; 244/54; 248/593
[58] Field of Search ............... 244/53 R, 54, 134 R, 244/134 B, 134 C; 60/39.31, 39.093; 248/219.1, 232, 593, 638; 165/67, 69

[56] References Cited

U.S. PATENT DOCUMENTS 3,916,944 11/1975 Crawford et al. .
4,023,756 5/1977 Baker .
4,050,988 9/1977 Lemercier .
4,458,866 7/1984 Graves ............................ 248/232
4,709,908 12/1987 Joseph et al. .
4,875,655 10/1989 Bender et al. .................... 244/54
4,993,489 2/1991 McLeod .
4,997,158 3/1991 James .

Primary Examiner—Galen L. Barefoot
Attorney, Agent, or Firm—Bacon & Thomas

[57] ABSTRACT

An isolator assembly for use in minimizing mechanical thermal and/or vibrationary strains between two structures is disclosed. The isolator assebly generally includes two spaced base members which are interconnected by a plurality of equally spaced rods. The length, diameter and material of the rods are determined based on the particular environment within which the isolator assembly is utilized. The invention has particular application in supporting a hot air blower tube within a cowling of a jet engine unit.

10 Claims, 4 Drawing Sheets

STRAIN ISOLATOR ASSEMBLY

BACKGROUND

1. Field Of the Invention

The present invention pertains to a strain isolator assembly and, more particularly, to an isolator assembly for minimizing mechanical thermal and vibrationary strains between two interconnected structures.

2. Discussion of the Prior Art

There exist many situations wherein two structures must be secured together in a high thermal and/or vibration environment. In so, me situations, it may be necessary or desirable to minimize thermal and vibrationary transfers between the two structures. In these situations, a strain isolating mounting arrangement may be required. Under these conditions, such mounting arrangements will often be subject to stresses which can lead to fatigue failure.

An example of an environment wherein a mounting arrangement is subject to extreme heat and vibration factors is in jet engines. For instance, it is common in the art of jet engines to mount a hot air blower tube within a cowling surrounding the air intake passage of the engine for de-icing purposes or to maintain a substantially laminar intake air flow. Such tubes are generally mounted to an end wall of the jet engine casing, within the cowling, by means of a bracket. It is not uncommon for such tubes to reach temperatures of about 600° F. and to be subject to varying degrees of vibration during operation of the jet engine. These factors combine to cause these mounting arrangements to be prone to fatigue failures of the support bracket structure which can create a dangerous condition if not readily detected.

Therefore, there exists a need in the art for an isolation mounting arrangement that will resist fatigue failure even in high thermal and vibration environments.

SUMMARY OF THE INVENTION

It is therefore an object of the present invention to provide an isolation mounting arrangement that can be effectively used to interconnect two structures in high thermal and vibration environments without being subject to premature fatigue failure.

It is also an object of the present invention to provide an isolation mounting arrangement that will minimize heat transfer between the two structures.

These and other objects of the invention are achieved by providing an isolator assembly for use in securing two structures together and which functions to minimize the transfer of thermal and vibrationary strains acting on one of the structures from the one structure to the other. According to the present invention, the isolation assembly comprises a pair of spaced plate members, each of which is adapted to be fixedly secured to a respective one of the two structures, and a plurality of relatively narrow rods interconnecting the plate members. The rods can be formed from either metal or composite materials depending upon the environment within which the isolation assembly is used. The diameters and lengths of the rods may also be varied according to the required load capacity while providing a relatively low lateral stiffness necessary to overcome the fatigue problem.

These and other objects, features and advantages of the present invention will become more readily apparent from the following detailed description of the invention when taken in conjunction with the drawings wherein like reference numerals refer to corresponding parts in the several views.

DETAILED DESCRIPTION OF A PREFERRED EMBODIMENT

Figure 1:
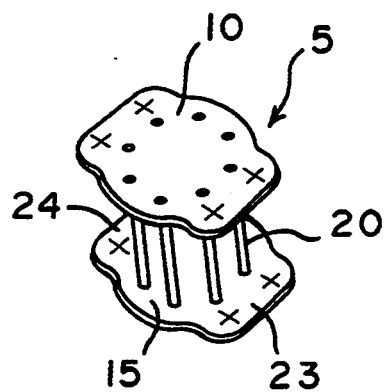
FIG. 1 depicts a perspective view of the isolator assembly according to a preferred embodiment of the invention.

With initial reference to FIG. 1, the isolator assembly according to the present invention is generally indicated at 5 and includes an upper base member 10 and a lower base member 15 which are interconnected by a plurality of rods 20. Base members 10 and 15 are shown to constitute plates which extend in generally parallel planes, however, base members 10 and 15 may be angled with respect to each other depending upon the prevailing mounting requirements without departing from the spirit of the invention. In the preferred embodiment, each of base members 10 and 15 include tabs 23,24 located at opposite ends thereof for readily securing base members 10 and 15 to respective support structures as will be more fully discussed below. The base members 10 and 15 are preferably formed from metal, such as aluminum, titanium or steel, but could also be formed from a composite material as well.

Rods 20 are secured between base members 10 and 15 so as to be generally parallel to one another and to be equally spaced. The rods 20 can be secured at there respective ends to base members 10 and 15 in a number of ways depending on the material of the rods 20. For instance, if rods 20 are formed from aluminum, steel or titanium, they are preferably threaded and/or welded to base members 10 and 15. If rods 20 are formed from a composite material, an epoxy can be utilized to fixedly secure the rods 20 to the base members 10 and 15.

The specific rod material used, as well as the length and diameter of the rods, can be varied depending on the environment within which isolator assembly 5 is utilized. For instance, if isolator assembly is used in a rather high thermal environment and/or a high vibration environment, steel or titanium is the preferred material for rods 20 along with base members 10 and 15. A rather high thermal environment is intended to include any environment wherein temperatures of approximately 300° F. or greater are experienced. If a thermal environment of below 300° F. is present, rods 20 can be manufactured from aluminum or composite materials.

In addition, the number of rods 20 utilized and the thicknesses of rods 20 can be varied depending upon the loads to which isolator assembly will be subjected. Of course, the amount of thermal energy which rods 20 will transmit between base members 10 and 15 will increase with the addition of more rods 20 so there is an trade-off present.

Figure 3:
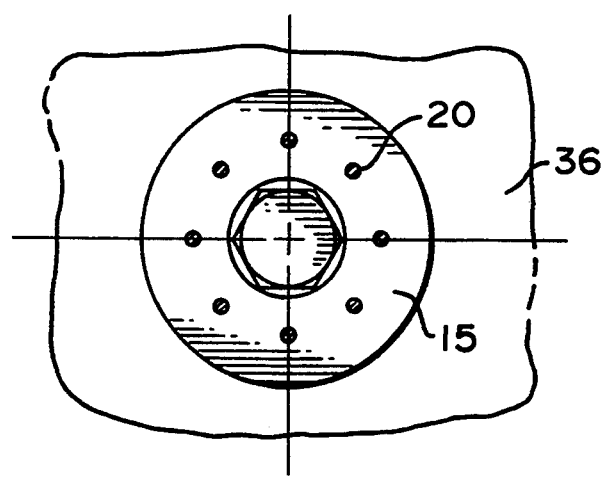
FIG. 3 shows a cross-sectional view taken along line 3—3 in FIG. 2.
Figure 2:
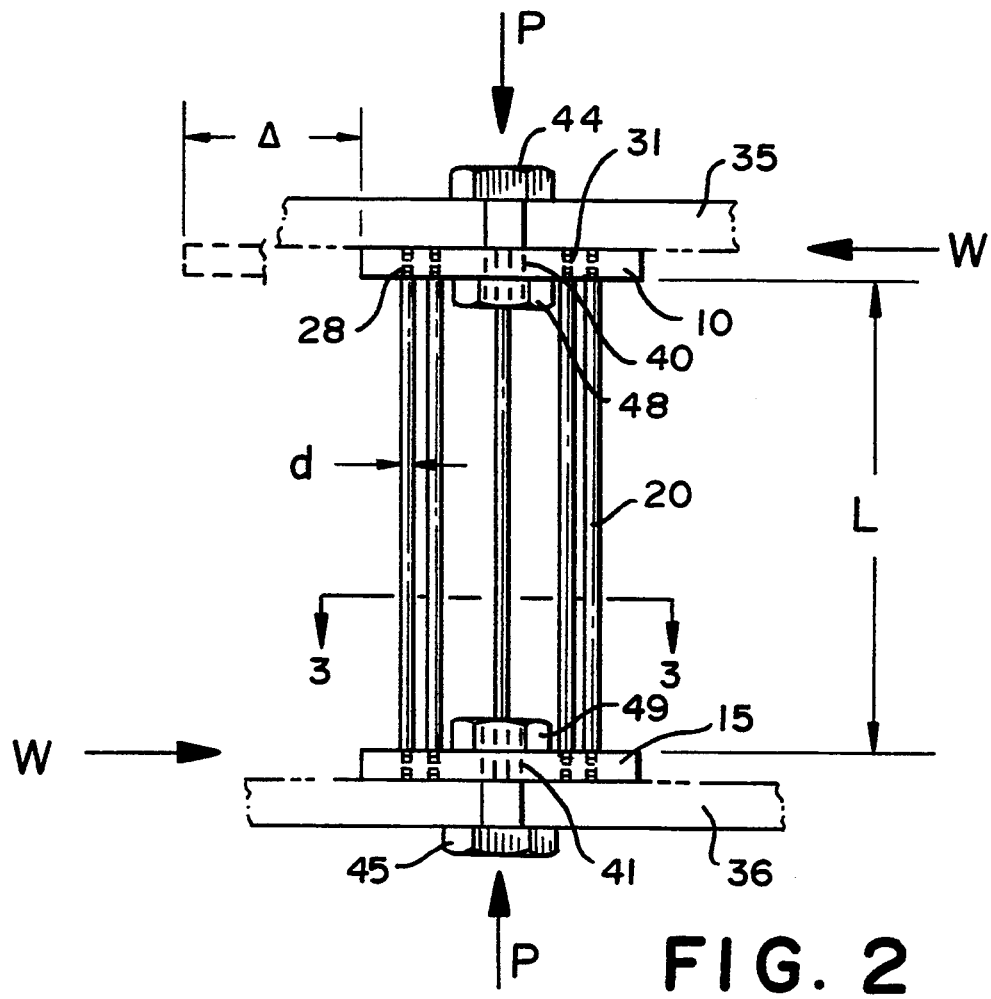
FIG. 2 shows a partial side view of the isolator assembly of FIG. 1 secured between two structures.

In a preferred embodiment of the invention as shown in FIGS. 2 and 3, base members 10 and 15 are interconnected by eight (8), equidistant rods 20. Rods 20 include ends 28 that are brazed within apertures 31 in base members 10 and 15 to assure a secure connection. Base members 10 and 15 are shown secured to a pair of spaced support structures 35,36 by providing a central through hole 40,41 in base members 10 and 15 respectively and by securing each of the base plates to a respective one of the support structures by means of a bolt 44,45 which extends through a support structure 35,36 and through a central through hole 40, 41. Nuts 48,49 are then tightened unto bolts 44,45 to fixedly secure isolator assembly 5 to the spaced support structures 35,36. Obviously, this type of mounting arrangement for isolator assembly 5 does not utilize tabs 23,24 shown in FIG. 1 and therefore constitutes another possible mounting arrangement.

Figure 4:
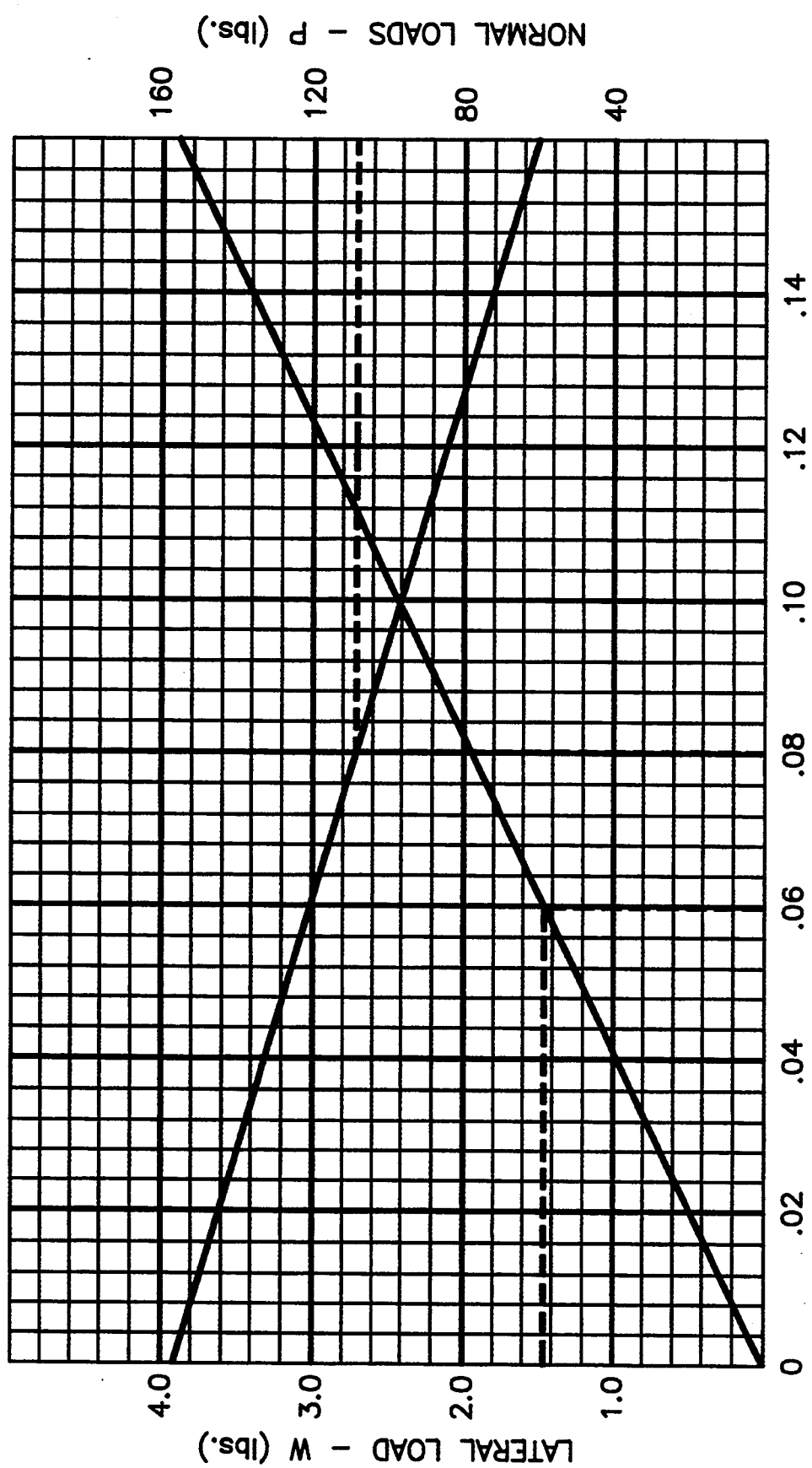
FIG. 4 is a graph which relates lateral and normal loads applied to the isolator assembly of the present invention to the lateral deflection of the isolator assembly.

FIG. 2 also indicates various loadings which isolator assembly 5 could be subjected to during use, such as a normal load P and a lateral load W. The combination of these loads can result in a lateral deflection (Δ) Of isolator assembly 5. Although it is desirable to permit a certain degree a deflection of isolator assembly 5 in the environments in which it is intended to be used, the material, length and diameter of rods 20 must be selected such that isolator assembly 5 will not fail due to fatigue. FIG. 4 represents the relationships of the deflection experienced by the preferred embodiment of isolator assembly shown in FIG. 2, as plotted on the abscissa, versus lateral and normal loads, which are plotted on ordinate axes. The results were obtained utilizing eight (8) titanium rods each having a diameter (d) of 0.04 inches (0.1 cm) and lengths creating a distance between base members 10 and 15 (designated "L" is FIG. 2) of two (2) inches (approximately 5 cm). Based on this data, which can be readily plotted for varying lengths, diameters and materials of rods 20, the deflection amount (Δ) can be readily determined along with the appropriate specifications for the isolator assembly for any particular loading situation. Furthermore, the material can be initially determined based on the thermal environment as discussed above.

Figure 5:
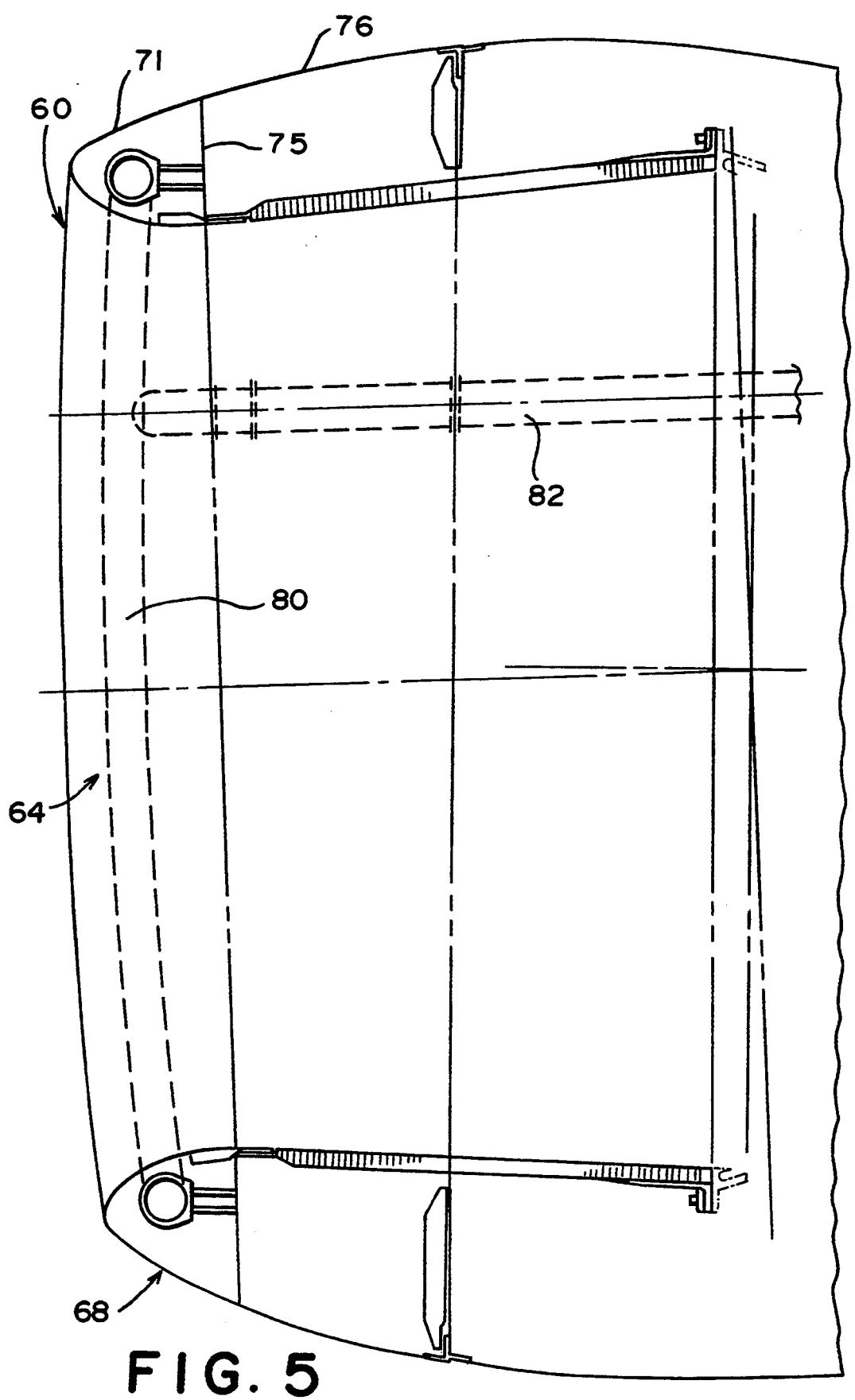
FIG. 5 shows a partial cross-sectional side view of a mounting of a hot air blower tube within a cowling of a jet engine by the isolator assembly according to the present invention.

One particular environment to which the isolator assembly 5 of the present invention can be advantageously used is in the art of jet engines. Referring to FIG. 5, a partial cross-section of a front portion 60 of a jet engine inlet cowl is shown. Front portion 60 of the jet engine includes an air intake area 64 defined by an annular cowling 68. Cowling 68 includes an outer shell 71 and terminates in an end wall 75 which is attached to an annular side portion 76 of the engine in a manner known in the art. Located within cowling 68 is a piccolo tube 80 through which hot air is adapted to be blown from a feed line 82 in a manner known in the art for de-icing purposes. Since the de-icing problem is generally concentrated only at this cowling 68, it is desirable not to transmit the thermal energy from hot air tube 80 to end wall 75 and annular side portion 76. Such known hot air tubes 80 are generally formed from stainless steel and are approximately two (2) inches in diameter. Since these tubes 80 are used in high thermal and vibration environments, the mounting assemblies for these tubes 80 within cowlings 68 are subject to fatigue failure.

Figure 6:
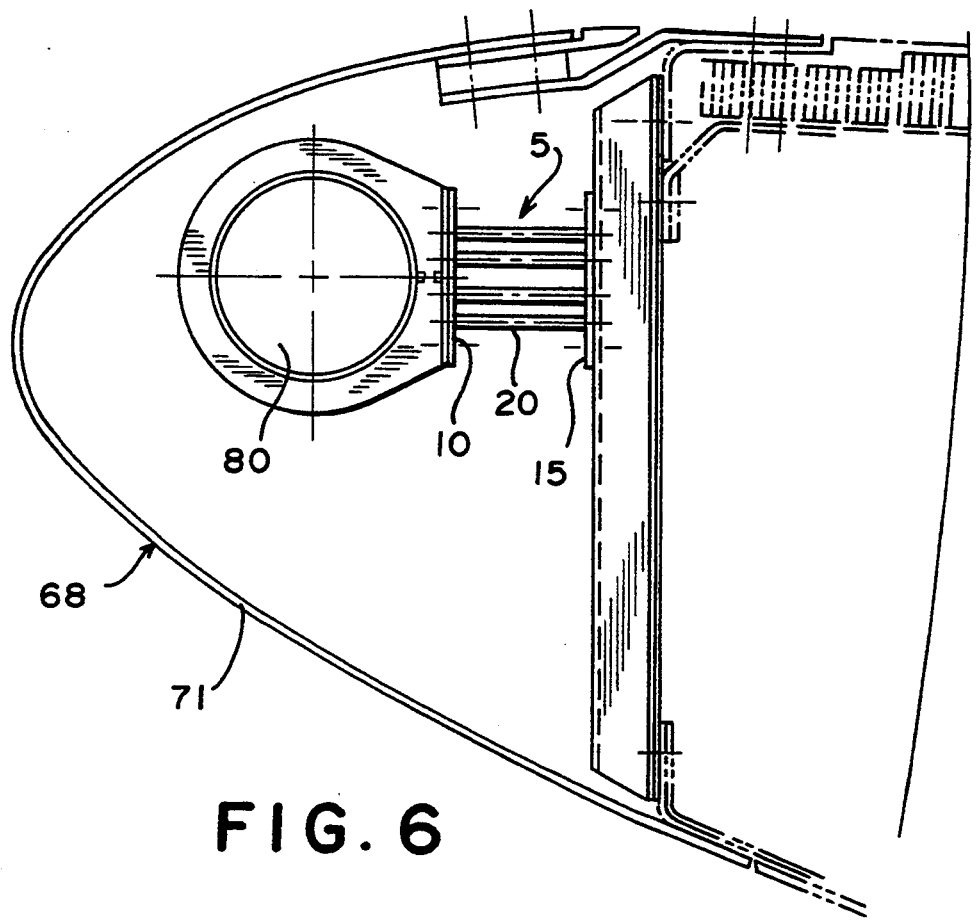
FIG. 6 is an enlarged view of the mounting arrangement shown in FIG. 5.
Figure 7:
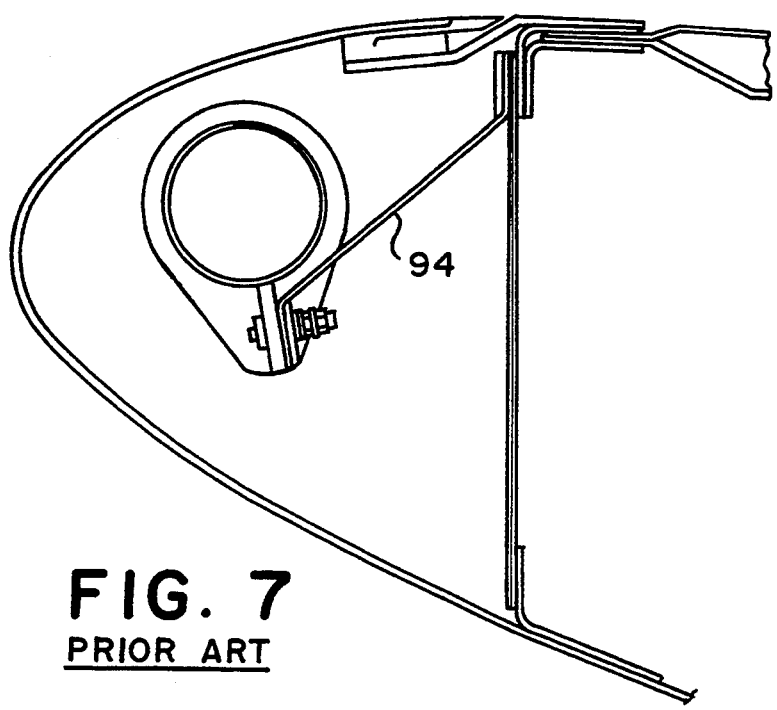
FIG. 7 is a view similar to that shown in FIG. 3 but depicting a mounting arrangement according to the prior art.

FIGS. 6 and 7 represent the mounting of hot air tubes 80 according to the present invention and the prior art respectively. In FIG. 6, the isolator assembly 5 of the present invention is used to secure hot air tube 80 to end wall 75. In the preferred embodiment, isolator assembly 5 is welded to both the hot air tube 80 and end wall 75 at tabs 23,24. Since such hot air tubes commonly reach temperatures of approximately 600° F., the isolator assembly 5 shown in FIG. 6 utilizes eight (8) titanium rods which are approximately two (2) inches (approximately 5 cm) in length and have a diameter of 0.04 inches (0.1 cm). The thermal heat transfer characteristics of rods 20, along with their corresponding surface area of contact with the base members 10 and 15, is substantially less than that associated with the angled mounting bracket 94 used in the prior art as shown in FIG. 7.

It should be readily apparent that the isolator assembly 5 of the present invention can be advantageously utilized in a various thermal and/or vibrational environments. For example, one additional application of the present invention would be to use isolator assembly 5 to secure the tiles or, in the alternative, heat resistant panels to the body of the space shuttle. Currently, there is some degree of problems in maintaining the integrity of the heat protecting layer of tiles on the shuttle throughout voyages. It is not uncommon for these tiles to be subjected to outer temperatures of approximately 2500° F. and inner temperatures of around 1000° F. In addition, these surfaces are subjected to varying levels of vibration which, in combination with the temperature variations, leads to the adhesion failure of the tiles. Therefore, the isolator assembly of the present invention could have application in this area as well, wherein steel or titanium rods could be effectively utilized to increase the fatigue related life of these mounting arrangements.

Therefore, although described with respect to particular embodiments of the invention, it is to be understood that various changes and/or modifications can be made to the invention without departing "form the spirit of the invention. In general, the invention is only intended to be limited by the scope of the following claims.

I claim:

1. An isolator assembly for use in minimizing thermal and/or vibrationary strains between a hot air blower tube and a cowling of a jet engine comprising:
    a jet engine unit including a cowling member located about an air intake portion of said jet engine unit;
    a hot air blower tube located within said cowling about said air intake portion;
    first and second spaced base members, said first base member being fixedly secured to said jet engine unit and said second base member having said air blower tube attached thereto; and
    a plurality of rods, each of said rods having first and second ends fixedly secured to a respective one of said first and second base members.

2. A strain isolator assembly as claimed in claim 1, wherein said rods are formed from a metal selected from the group consisting of aluminum, titanium and steel.

3. A strain isolator assembly as claimed in claim 2, wherein the metal comprises steel.

4. A strain isolator assembly as claimed in claim 2, wherein the metal comprises titanium.

5. A strain isolator assembly as claimed in claim 2, wherein the metal comprises aluminum.

6. A strain isolator assembly as claimed in claim 1, wherein said rods have diameters of approximately 0.04 inches (0.1 cm).

7. A strain isolator assembly as claimed in claim 6, wherein said base members are spaced approximately 2 inches (5 cm) by said rods.

8. A strain isolator assembly as claimed in claim 2, wherein said rods are welded to said base members.

9. A strain isolator assembly as claimed in claim 2, wherein said rods are threadably secured to said base members.

10. A strain isolator assembly as claimed in claim 1, wherein said rods are formed from a composite material and are secured to said base members by an adhesive.

* * * * *